(12) United States Patent
Kim et al.

(10) Patent No.: US 7,817,311 B2
(45) Date of Patent: Oct. 19, 2010

(54) SCANNING APPARATUS ADAPTED TO RECEIVE A PLURALITY OF DIFFERENT LIGHT SOURCE PARTS

(75) Inventors: Hyun-surk Kim, Suwon-si (KR); Jung-kwon Kim, Seoul (KR); Dong-hun Lee, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 1046 days.

(21) Appl. No.: 11/502,353

(22) Filed: Aug. 11, 2006

(65) Prior Publication Data

US 2007/0109392 A1 May 17, 2007

(30) Foreign Application Priority Data

Nov. 11, 2005 (KR) .................... 10-2005-0108012

(51) Int. Cl.
H04N 1/04 (2006.01)
(52) U.S. Cl. .................. 358/475; 358/474; 358/483; 358/497
(58) Field of Classification Search ............. 358/475, 358/509, 474, 483, 497; 399/220, 221, 211, 399/212; 362/285, 249.01, 257, 260, 632–634, 362/611–616, 11–13; 250/208.1, 239, 234–236, 250/578.1
See application file for complete search history.

(56) References Cited

U.S. PATENT DOCUMENTS 5,038,028 A 8/1991 Boyd et al.

FOREIGN PATENT DOCUMENTS

| CN | 1603945 | | 4/2005 |
|---|---|---|---|
| CN | 2701188 | | 5/2005 |
| JP | 08122938 A | * | 5/1996 |
| JP | 09-114174 | | 5/1997 |
| JP | 2000-098277 | | 4/2000 |
| JP | 2000-241728 | | 9/2000 |
| JP | 2001-197262 | | 7/2001 |
| JP | 2004-021138 | | 1/2004 |
| JP | 2005-010255 | | 1/2005 |
| JP | 2005-051566 | | 2/2005 |
| JP | 2005-259365 | | 9/2005 |

* cited by examiner

Primary Examiner—Cheukfan Lee
(74) Attorney, Agent, or Firm—Roylance, Abrams, Berdo & Goodman, L.L.P.

(57) ABSTRACT

A scanning apparatus has a light source part scanning a scanning beam on an original document. A frame has a light input part and a light output part. A reflection mirror is arranged in the frame and reflects the scanning beam inputted through the light input part to the light output part along a predetermined light proceeding path. A light receiving part is supported on the light output part, and receives the scanning beam reflected by the reflection mirror. A light source supporting member supports the light source part on the frame so that the beam scanned by the light source part and reflected on the original document passes through the light input part and proceeds along the light proceeding path. The light source supporting member mounts the different light source parts in the frame.

24 Claims, 4 Drawing Sheets

SCANNING APPARATUS ADAPTED TO RECEIVE A PLURALITY OF DIFFERENT LIGHT SOURCE PARTS

CROSS-REFERENCE TO RELATED APPLICATIONS

This application claims the benefit under 35 U.S.C. §119(a) of Korean Patent Application No. 2005-0108012, filed on Nov. 11, 2005, in the Korean Intellectual Property Office, the entire disclosure of which is hereby incorporated by reference.

BACKGROUND OF INVENTION

1. Field of Invention

The present invention relates to a scanning apparatus. More particularly, the present invention relates to a scanning apparatus to which different light source parts having various light characteristics are applied.

2. Description of the Related Art

Generally, a scanning apparatus scans an original document to obtain image information. The scanning apparatus is widely used to produce duplicates by using the image information or to utilize the image information.

FIG. 1 is a schematic view illustrating a conventional scanning apparatus 101. As shown, the scanning apparatus 101 is provided with a light source part 110, a reflection mirror 120, a light receiving part 130 and a frame 140 supporting these elements. The light source part 110 scans a scanning beam onto an original document. The scanned beam is reflected on the original document to obtain image information of the original document on the basis of reflection characteristics. A plurality of reflection mirrors 120 receive the scanning beam reflected on the document to reflect the beam along a light path L to the light receiving part 130. The light receiving part 130 receives the scanning beam to obtain the image information of the original document.

Many kinds of light sources are used in the light source part 110. For example, a CCFL (cold cathode fluorescent lamp) light source device, ax Xe-lamp light source device, an LED (light-emitting diode) light source device, and other various kinds of light source devices can be employed. As such, light source devices have different sizes, scanning speeds, chromatic aberrations, light intensities and other light characteristics. A suitable light source device is selected on the basis of its use and cost.

However, the light source part 110, the reflection mirror 120 and the light receiving part 130 are arranged to be suitable for a specific kind of light source device. Accordingly, different kinds of light source devices cannot be used. Also, the cost may increase to provide the light source part 110, the reflection mirror 120, the light receiving part 130 and the frame 140 to be suitable for the specific kind of light source device.

Accordingly, a need exists for a scanning apparatus adapted to use different light sources.

SUMMARY OF THE INVENTION

An object of the present invention is to provide a scanning apparatus to which different kinds of light source parts having various light characteristics may be applied.

Additional features of the invention are set forth in the description that follows, and in part are apparent from the description, or may be learned by practice of the present invention.

The foregoing and other aspects of the present invention may be achieved by providing a scanning apparatus having a light source part scanning a scanning beam on an original document. A frame has a light input part and a light output part. A reflection mirror is arranged in the frame and reflects the scanning beam inputted through the light input part to the light output part along a predetermined light proceeding path. A light receiving part is supported on the light output part, and receives the scanning beam reflected by the reflection mirror. A light source supporting member supports the light source part on the frame so that the beam scanned by the light source part and reflected on the original document may pass through the light input part and proceed along the light proceeding path. The light source supporting member mounts the different light source parts in the frame.

According to an aspect of the present invention, the frame is provided with a seating part in which the light source supporting member is seated. The light source supporting member is provided to have different types to be attached to and detached from the seating part to be suitable for the light source parts.

According to an aspect of the present invention, a scanning apparatus further includes a driving part provided on the frame and driving the light source part. The driving part is provided to have different types to be suitable for the different light source parts.

According to an aspect of the present invention, the different light source parts may include a CCFL light source device, an Xe-lamp light source device and an LED light source device.

According to an aspect of the present invention, the light source supporting member is plurally provided to be suitable for the different light source parts.

According to an aspect of the present invention, the light source supporting member is formed with a first mounting groove to which the first light source part is mounted, and a second mounting groove of a different size from the first mounting groove to which the second light source part of a different size from the first mounting groove is mounted.

According to an aspect of the present invention, the first mounting groove and the second mounting groove are integrally formed.

According to an aspect of the present invention, the first mounting groove and the second mounting groove are spaced apart.

It is to be understood that both the foregoing general description and the following detailed description are exemplary and explanatory and are intended to provide further explanation of the invention as claimed.

Other objects advantages, and salient features of the invention will become apparent from the detailed description, which, taken in conjunction with the annexed drawings, discloses preferred exemplary embodiments of the invention.

BRIEF DESCRIPTION OF THE DRAWINGS

The above and/or other aspects and advantages of the prevent invention will become apparent and more readily appreciated from the following description of the exemplary embodiments, taken in conjunction with the accompany drawings, in which.

Throughout the drawings, like reference numerals will be understood to refer to like parts, components and structures.

DETAILED DESCRIPTION OF EXEMPLARY EMBODIMENTS

Figure 1:
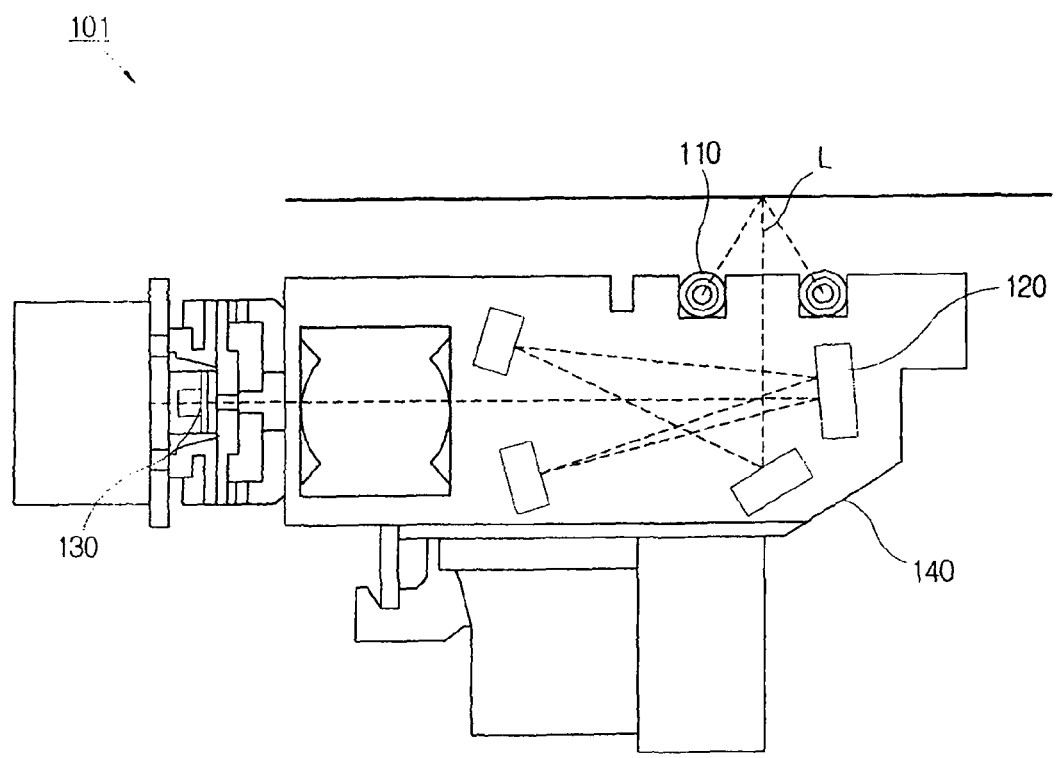
FIG. 1 is a schematic view illustrating a conventional scanning apparatus.

Reference will now be made in detail to the exemplary embodiments of the present invention, examples of which are illustrated in the accompanying drawings. The embodiments are described below to explain the exemplary embodiments of the present invention by referring to the figures.

The same elements are given the same reference numerals in various exemplary embodiments, and they will be typically described in the first exemplary embodiment, and are omitted in the other exemplary embodiments as necessary to provide a clear and concise description.

Figure 2:
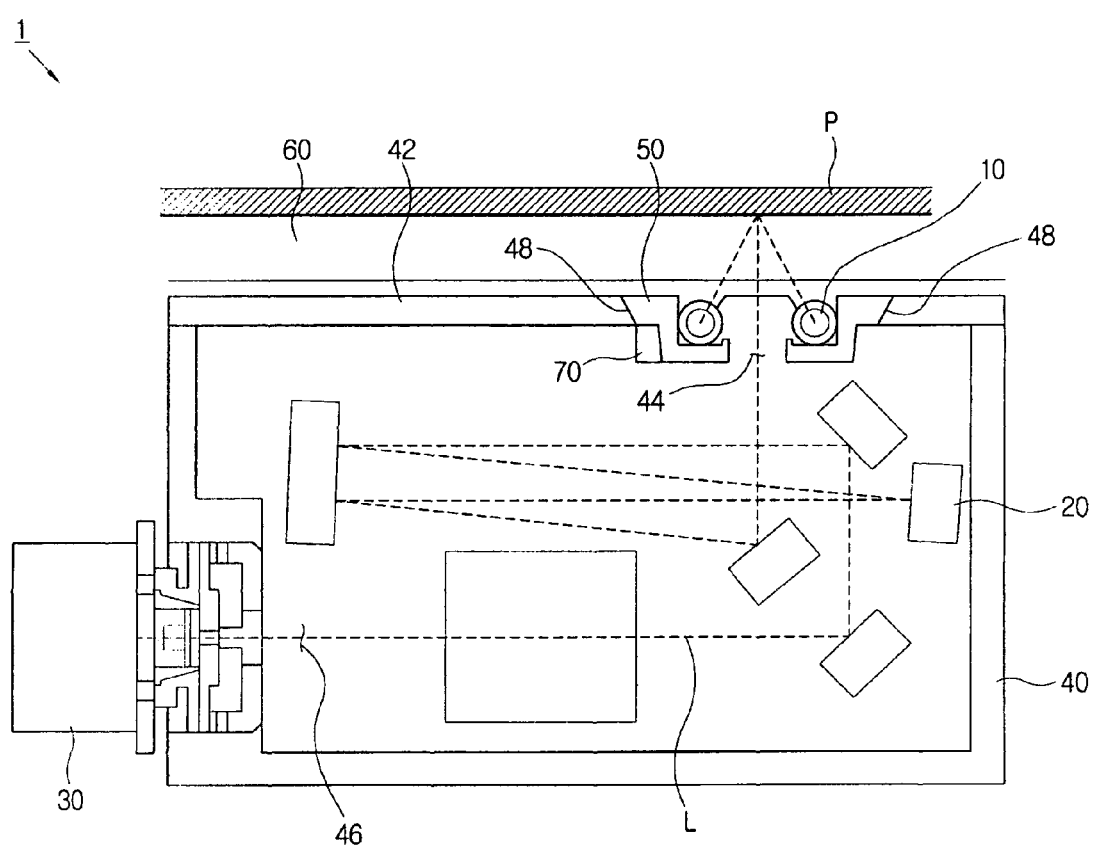
FIGS. 2 and 3 are schematic views illustrating a scanning apparatus according to a first exemplary embodiment of the present invention.
Figure 3:
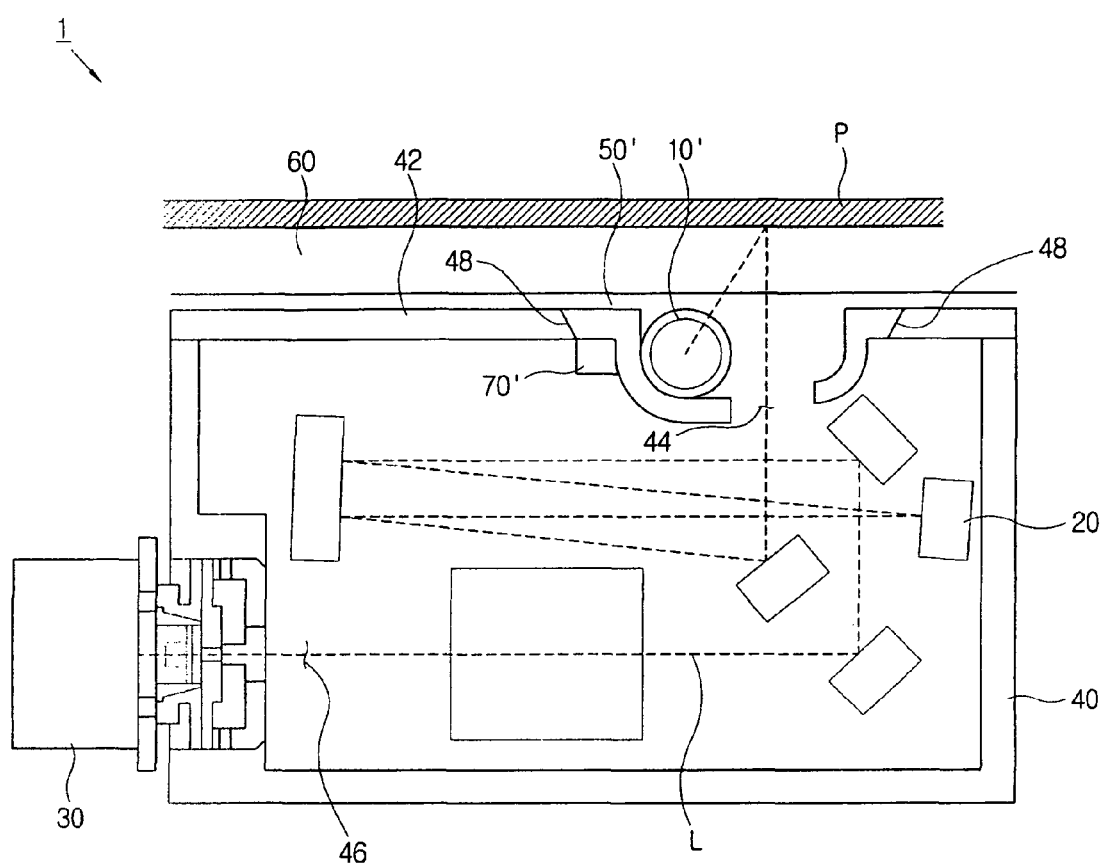

FIGS. 2 and 3 are schematic views illustrating a scanning apparatus 1 according to a first exemplary embodiment of the present invention. As shown, the scanning apparatus 1 is provided with a light source part 10 (FIG. 2) or 10' (FIG. 3) scanning a scanning beam onto an original document P. A frame 40 has a light source input part 44 and a light source output part 46. A reflection mirror 20 is arranged in the frame 40 to reflect the scanning beam inputted through the light input part 44 to the light output part 46 along a predetermined light proceeding path L. A light receiving part 30 is supported on the light output part 46 to receive the scanning beam reflected by the reflection mirror 20. A light source supporting member 50 (FIG. 2) or 50' (FIG. 3) supports the light source part 10 or 10', respectively, on the frame 40 so that the beam scanned by the light source part 10 or 10' and reflected on the original document P passes through the light input part 44 and proceeds along the light proceeding path L. The light source supporting members 50 and 50' are exchangeably arranged in the frame 40 in correspondence to the different kinds of light source parts 10 and 10' of various sizes. The scanning apparatus 1 may include a scanner, a photocopier, a multi-functional device, and other suitable devices.

A supporting glass 60 supports the original document P to be scanned on a surface thereof. The light source part 10 or 10' is located on the opposite surface of the supporting glass 60 to scan a predetermined scanning beam onto the original document P. The beam scanned by the light source part 10 or 10' reaches the original document P via the supporting glass 60 according to an image on the original document P to be reflected on the light input part 44 with a different reflecting characteristic.

The frame 40 is provided with the light input part 44 through which the scanning beam reflected from the original document passes and the light output part 46 in which the light receiving part 30 is arranged. The frame 40 is provided with a seating part 48 in which the light source member 50 or 50' is seated. The light source supporting member 50 or 50' may be coupled to the seating part 40 by a screw, a coupling projection, and other known coupling means. The frame 40 is provided with a cover part 42. The seating part 48 is provided in the cover part 42 adjacent to the. supporting glass 60. The cover part 42 substantially prevents a noise beam from the supporting glass 60 from being introduced into the light receiving part 30, and substantially prevents alien substances from being introduced into the frame 40.

The reflection mirror 20 is supported on the frame 40 between the light input part 44 and the light output part 46 to reflect the scanning beam so that the scanning beam may proceed along the predetermined light proceeding path L. The reflection mirror 20 may be provided plurally or singularly.

The light receiving part 30 receives the scanning beam to obtain image information of the original document P. The light receiving part 30 may include a charge-coupled device (CCD) or other light sensors. The scanning apparatus 1 is provided with an AD convert part (not shown) that converts an analog image received by the light receiving part 30 into a digital image.

The light source supporting member 50 or 50' supports the light source parts 10 or 10' and is attached to or detached from the seating part 48. When the light source supporting member 50 or 50' is mounted to the seating part 48, the light source parts 10 and 10' are arranged in a predetermined position so that the beam scanned by the light source part 10 or 10' is reflected on the original document P and passes through the light input part 44 to proceed along the light proceeding path L. Accordingly, once the light source supporting member 50 or 50' is mounted to the seating part 48, the position of the light source part 10 or 10' may be arranged to be suitable for the light proceeding path L.

The light source parts 10 and 10' may include various kinds of light source devices that are different than each other at least with respect to their size. Each of the light source parts 10 and 10' may include a CCFL (cold cathode fluorescent lamp) light source device, an Xe-lamp (xenon lamp) light source device, an LED (light-emitting diode) light source device, or any other known light source device. Such light source devices have different light characteristics and sizes.

The frame 40 is provided with the light input part 44, the light output part 46 and the seating part 48 to proceed the scanning beam along the predetermined light proceeding path L though any kind or size of light source part 10 or 10' is used, and fixedly supports the reflection mirror 20 and the light receiving part 30.

In such a frame 40, the various types of light source supporting members 50 and 50' are provided to be attached to or detached from the seating part 48 to be suitable for the different light source parts 10 and 10'. Thus, by providing the different light source supporting members 50 and 50' to the seating part 48 to be suitable for the different the light source parts 10 and 10', the different light source parts 10 and 10' may be exchangeably supported by the frame 40.

For example, as shown in FIG. 2, when a light source device with a relatively small diameter, like a CCFL, is used for the light source part 10, the light source supporting member 50 has a relatively small size to be suitable for the CCFL. As shown in FIG. 3, when a light source device with a relatively large diameter, like an Xe-lamp, is used as the light source part 10, the light source supporting member 50' has a relatively large size to be suitable for the Xe-lamp. The light source supporting members 50 and 50' may be integrally formed to support the different light source parts 10 and 10' as necessary.

Accordingly, the scanning apparatus 1 may use light source devices having various light characteristics as the light source parts 10 and 10'.

The scanning apparatus 1 is provided with a driving part 70 (FIG. 2) or 70' (FIG. 3) supported on the frame 40 to drive the light source part 10 or 10'. The driving parts 70 and 70' are provided to be suitable for the different light source parts 10 and 10', respectively. The driving parts 70 and 70' may be exchangeably supported on the frame 40 to be suitable for the light source parts 10 and 10'. The driving parts 70 and 70' may respectively include an inverter driving the light source parts 10 and 10' on the basis of an on/off signal received from a controller (not shown).

Preferably, but not necessarily, the driving part 70 or 70' is supported on the light source supporting member 50 or 50' to be attached to or detached from the frame 40 integrally with the light source part 10 or 10'. Alternatively, the driving part 70 or 70' may be directly attached to or detached from the frame 40 separate from the light source supporting member 50 or 50'.

The driving part 70 or 70' may be provided as a driving circuit in the light source part 10 or 10'. In this case, a separate driving part 70 or 70', apart from the light source part 10 or 10', is not necessary.

In the first exemplary embodiment of the present invention, the different light source parts 10 and 10' are exchangeably applied to mount the light source supporting members 50 and 50' having various types to the fixed cover part 42. However, the light source supporting member 50 or 50' and the cover part 42 may be integrally formed so that the cover part 42 is adapted to be suitable for the different light source parts 10 and 10', and then may be exchangeably mounted to the frame 40.

As described above, in the scanning apparatus 1 according to exemplary embodiments of the present invention, the frame 40, the reflection mirror 20 and the light receiving part 30 are arranged such that the scanning beam may proceed along the proceeding path L regardless of the size and the kind of the light source parts 10 and 10', and, the light source parts 10 and 10' may be attached to and detached from the frame 40.

Accordingly, a scanning characteristic of the scanning apparatus 1 may be improved by using different light source devices for the light source parts 10 and 10'.

Hereinafter, a scanning apparatus according to the second exemplary embodiment of the present invention referring to FIG. 4 will be described.

Figure 4:
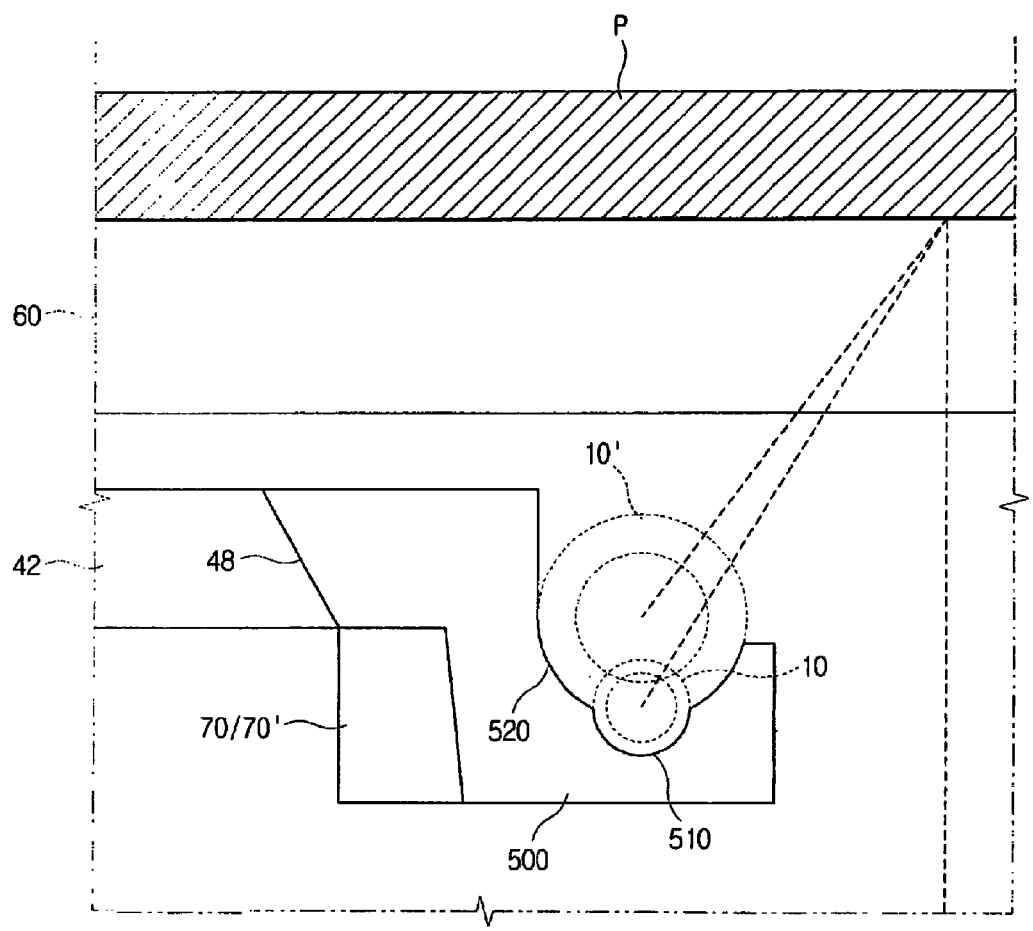
FIG. 4 is a schematic view illustrating a scanning apparatus according to a second exemplary embodiment of the present invention.

FIG. 4 is a schematic view illustrating the scanning apparatus according to the second exemplary embodiment of the present invention. As shown, a light source supporting member 500 is formed with a plurality of mounting parts 510 and 520 to which different light source parts 10 and 10' are exchangeably mounted. The light source supporting member 500 is mounted in the frame 40. The light source supporting member 500 is provided with a first mounting groove 520 to which a large size of first light source part 10 is mounted. A second mounting groove 510 is additionally formed in a smaller size than the first mounting groove 520 in a side of the first mounting groove 520 so that the second light source part 10 of a smaller size than the first light source part 10' may be mounted therein.

The first mounting groove 520 is formed larger than the second mounting groove 510 to be suitable for an external circumference of the first light source part 10'. The second mounting groove 510 is additionally formed on a lower side of the first mounting groove 520 with a smaller diameter to be suitable for an external circumference of the second light source part 10. The first light source part 10' is supported to the first mounting groove 520, so that the beam scanned by the light source part 10' may be reflected on the original document P and pass through the light input part 44 to proceed along the light proceeding path L. Similarly, the second light source part 10' is supported to the second mounting groove 510, so that the beam scanned by the light source part 10' may proceed along the light proceeding path L.

The light source supporting member 500 is fixedly supported on the seating part 48, unlike the first exemplary embodiment, and the different light source parts 10 and 10' are exchangeably mounted to the light source supporting member 500 Accordingly, as the light source parts 10 and 10' are exchanged, the driving parts 70 and 70' driving the light source parts 10 and 10' may be exchanged. The driving part 70 or 70' may be supported on the light source supporting member 500, the cover part 42 or the frame 40.

As shown in FIG. 4, the first mounting groove 520 and the second mounting groove 510 are integrally formed but may be spaced apart.

The scanning apparatus according to exemplary embodiments of the present invention may be applied in a manufacturing process of the scanning apparatus. The two kinds of light source parts may be selectively mounted to a single scanning apparatus, thereby reducing manufacturing costs. Also, the scanning apparatus according to exemplary embodiments of the present invention may be applied to exchangeably use various light source parts when used by a user.

As described above, the scanning apparatus according to exemplary embodiments of the present invention may employ different light source parts having various light characteristics.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A scanning apparatus having a light source part scanning a scanning beam on an original document, comprising:
   a frame having a light input part and a light output part;
   a reflection mirror arranged in the frame and reflecting the scanning beam inputted through the light input part to the light output part along a predetermined light proceeding path;
   a light receiving part supported on the light output part, and receiving the scanning beam reflected by the reflection mirror; and
   a light source supporting member for supporting the light source part on the frame so that the beam scanned by the light source part and reflected on the original document passes through the light input part and proceeds along the light proceeding path, such that a plurality of light source parts having different diameters are adapted to be received in the frame.

2. A scanning apparatus according to claim 1, wherein the frame has a seating part that receives the light source supporting member.

3. A scanning apparatus according to claim 2, wherein the seating part is adapted to receive a plurality of different light source supporting members, each light source supporting member being suitable for one of the plurality of different light source parts.

4. A scanning apparatus according to claim 3, wherein a driving part is connected the frame to drive the light source part.

5. A scanning apparatus according to claim 4, wherein the driving part is removably connected to the frame such that different driving parts are installed corresponding to the light source part.

6. A scanning apparatus according to claim 5, wherein the plurality of different light source parts are selected from the group consisting of a CCFL light source device, an Xe-lamp light source device, and an LED light source device.

7. A scanning apparatus according to claim 3, wherein the plurality of different light source parts are selected from the group consisting of a CCFL light source device, an Xe-lamp light source device, and an LED light source device.

8. A scanning apparatus according to claim 1, wherein the plurality of different light source parts are selected from the group consisting of a CCFL light source device, an Xe-lamp light source device, and an LED light source device.

9. A scanning apparatus according to claim 1, wherein a plurality of different light source supporting members are adapted to be received one at a time by the frame, each light source supporting member being adapted to receive one of the different light source parts.

10. A scanning apparatus according to claim 1, wherein the light source supporting member is formed with a first mounting groove to which a first light source part is mounted; and
a second mounting groove of a different size from the first mounting groove is formed in the light source supporting member to which a second light source part of a different size from the first mounting groove is mounted.

11. A scanning apparatus according to claim 10, wherein the first mounting groove and the second mounting groove are integrally formed.

12. A scanning apparatus according to claim 10, wherein the first mounting groove and the second mounting groove are spaced apart.

13. A scanning apparatus, comprising:
a light source part for scanning a scanning beam on an original document;
a frame having a light input part and a light output part;
a reflection mirror arranged in the frame and reflecting the scanning beam inputted through the light input part to the light output part along a predetermined light proceeding path;
a light receiving part supported on the light output part and receiving the scanning beam reflected by the reflection mirror; and
a seating part in the frame adapted to removably receive one of a plurality of different light source part supporting members, each light source supporting member being adapted to receive one of a plurality of light source parts having different diameters such that the light source part scans and reflects the scanning beam on the original document to pass through the light input part to the light proceeding path.

14. A scanning apparatus according to claim 13, wherein a driving part is connected to each of the plurality of light source supporting members.

15. A scanning apparatus according to claim 14, wherein each of the driving parts is integrally formed with its respective light source supporting member.

16. A scanning apparatus according to claim 13, wherein the plurality of different light source parts are selected from the group consisting of a CCFL light source device, an Xe-lamp light source device, and an LED light source device.

17. A scanning apparatus, comprising:
a light source part for scanning a scanning beam on an original document;
a frame having a light input part and a light output part;
a reflection mirror arranged in the frame and reflecting the scanning beam inputted through the light input part to the light output part along a predetermined light proceeding path;
a light receiving part supported on the light output part and receiving the scanning beam reflected by the reflection mirror; and
a light source supporting member connected to the frame and adapted to receive a plurality of light source parts having different diameters such that the light source part scans and reflects the scanning beam on the original document to pass through the light input part to the light proceeding path.

18. A scanning apparatus according to claim 17, wherein the light source supporting member has a first mounting groove adapted to receive a first light source part and a second mounting groove of a different size than the first mounting groove adapted to receive a second light source part.

19. A scanning apparatus according to claim 18, wherein the first mounting groove and the second mounting groove are integrally formed.

20. A scanning apparatus according to claim 18, wherein the first mounting groove and the second mounting groove are spaced apart.

21. An image forming apparatus, comprising:
a light source part for scanning a scanning beam on an original document;
a frame having a light input part and a light output part;
a reflection mirror disposed in the frame and reflecting the scanning beam inputted through the light input part to the light output part along a predetermined light proceeding path;
a light receiving part supported on the light output part and receiving the scanning beam reflected by the reflection mirror; and
a light source supporting member connected to the frame and adapted to receive a plurality of light source parts having different diameters such that the light source part scans and reflects the scanning beam on the original document to pass through the light input part to the light proceeding path.

22. An image forming apparatus according to claim 21, wherein
the light source supporting member has a first mounting groove adapted to receive a first light source part and a second mounting groove of a different size than the first mounting groove adapted to receive a second light source part.

23. An image forming apparatus according to claim 22, wherein
the first mounting groove and the second mounting groove are integrally formed.

24. An image forming apparatus according to claim 22, wherein
the first mounting groove and the second mounting groove are spaced apart.

* * * * *